US010826125B2

(12) United States Patent
Zhang et al.

(10) Patent No.: US 10,826,125 B2
(45) Date of Patent: Nov. 3, 2020

(54) MONO-NUCLEI CATIONIZED MAGNESIUM SALT, PREPARATION METHOD AND APPLICATIONS THEREOF

(71) Applicant: Suzhou Institute of Nano-Tech and Nano-Bionics (Sinano), Chinese Academy of Sciences, SIP Suzhou (CN)

(72) Inventors: Yuegang Zhang, SIP Suzhou (CN); Wanfei Li, SIP Suzhou (CN)

(73) Assignee: Suzhou Institute of Nano-Tech and Nano-Bionics (Sinano), Chinese Academy of Sciences, Suzhou (CN)

( * ) Notice: Subject to any disclaimer, the term of this patent is extended or adjusted under 35 U.S.C. 154(b) by 265 days.

(21) Appl. No.: 15/769,667

(22) PCT Filed: Dec. 28, 2015

(86) PCT No.: PCT/CN2015/099184
§ 371 (c)(1),
(2) Date: Apr. 19, 2018

(87) PCT Pub. No.: WO2017/113053
PCT Pub. Date: Jul. 6, 2017

(65) Prior Publication Data
US 2018/0316059 A1 Nov. 1, 2018

(51) Int. Cl.
*H01M 10/0568* (2010.01)
*H01M 10/054* (2010.01)
(Continued)

(52) U.S. Cl.
CPC .......... *H01M 10/0568* (2013.01); *C07F 3/02* (2013.01); *H01M 6/166* (2013.01); *H01M 10/054* (2013.01); *H01M 2300/0025* (2013.01)

(58) Field of Classification Search
None
See application file for complete search history.

(56) References Cited

U.S. PATENT DOCUMENTS

2010/0136438 A1  6/2010  Nakayama et al.
2013/0115521 A1  5/2013  Doe et al.

FOREIGN PATENT DOCUMENTS

CN  103066326 A  4/2013
CN  103794815 A  5/2014

OTHER PUBLICATIONS

Utko et al., Reaction of MgCl2 with AlCl3 in ethyl acetate. The crystal structure of [Mg(CH3OCOC2H5)6][AlCl4]2 (Journal of Organometallic Chemistry; vol. 359, Issue 3, pp. 295-300 dated Jan. 17, 1989). (Year: 1989).*

(Continued)

Primary Examiner — Tracy M Dove
(74) Attorney, Agent, or Firm — Wang Law Firm, Inc.

(57) ABSTRACT

The invention relates to a mono-nuclei cationized magnesium salt, a preparation method and applications thereof. The mono-nuclei cationized magnesium salt has a chemical formula of $MgR_nMX_{4-m}Y_m$, wherein R is a non-aqueous solvent molecule, M includes $Al^{3+}$ and/or $B^{3+}$, X and Y respectively include halide ion and halogenoid ion, n is any one integer selected in the range of 0~6, and m is any one integer selected in the range of 0-4. The mono-nuclei cationized magnesium salt provided by the invention has a simple structure and excellent electrochemical properties, and the preparation method thereof features low cost, integrated synthesis, accessible raw materials, simple preparation process, and simple scaled production. The provided mono-nuclei cationized magnesium salt is used as the electrolyte of the rechargeable batteries, the generated electrolyte solution has a high ionic conductivity, a high reversible magnesium deposition-dissolution efficiency, excellent cir- (Continued)

culating performance and a high anode oxidation deposition potential. For example, when the electrolyte solution is applied to the magnesium batteries, the initial discharging capacity of the batteries can reach over 700 mAh/g, and the cycle number is greater than 20.

17 Claims, 7 Drawing Sheets

(51) Int. Cl.
    *C07F 3/02*     (2006.01)
    *H01M 6/16*     (2006.01)

(56) References Cited

OTHER PUBLICATIONS

International Search Report of PCT application PCT/CN2015/099184, dated Oct. 6, 2016.

* cited by examiner

MONO-NUCLEI CATIONIZED MAGNESIUM SALT, PREPARATION METHOD AND APPLICATIONS THEREOF

BACKGROUND OF THE INVENTION

Technical Field

The invention relates to a mono-nuclei cationized magnesium salt, a preparation method and applications thereof, belonging to the field of electrochemical energy sources.

Description of Related Art

To meet the requirements for efficient, clean, economical and safe energy systems of the 21st century, developing novel, environmentally-friendly, high-performance, large-scaled energy storage technologies and utilizing new energy sources efficiency have become an issue that draws attention from the whole world and are an irresistible trend of the future. A lithium-ion battery energy storage system as an efficient energy storage means draws more and more attentions from the energy departments and energy enterprises of all countries, and holds a dominant position in the current energy storage industrial field. However, global lithium resources are limited in reservation and not uniform in space distribution (lithium resources are mainly located in South America), not only resulting in high cost in the raw materials of lithium-ion batteries, but also generating risks of export limits by other countries in the future. Moreover, lithium-ion batteries have serious safety problems in applications to the large-scale battery fields such as automobiles and energy storage. For example, Tesla electric cars had many fire accidents, and Boeing airplanes 787 had many safety accidents. Safety problems have become the main bottleneck of the future lithium-ion battery industry and market development.

Compared with lithium, magnesium is higher in capacity, more in reservation, lower in price and higher in safety, and has been widely accepted as the most potential candidate of the post-lithium-ion batteries. In future, magnesium as an environmentally-friendly storage battery is expected to replace lithium-ion batteries in the electro-mobile and large-scaled energy storage fields. However, a magnesium battery faces many challenges in comparison with the mature lithium-ion battery energy storage technology.

The key factor that restrains the development of the rechargeable magnesium battery is that metal magnesium tends to form a dense passivation coating on the surface in the majority of non-protonic electrolyte solutions. The passivation coating is a poor conductor of magnesium ions, preventing magnesium ions from passing through, and finally resulting in malfunction to the battery. So far, electrolyte is still the biggest bottleneck that restrains the development of the rechargeable magnesium battery.

A large number of experiments prove that different from the frequently used lithium-ion salts ($LiClO_4$, $LiPF_6$, $Li(CF_3SO_3)_2$, etc.) in the commercial lithium-ion batteries, a layer of condense passivation coating which does not conduct magnesium ions tends to form in the non-protonic electrolyte polar solvents of simple mono-nuclei cationized magnesium salts (for example $MgCl_2$, $Mg(ClO_4)_2$, $Mg(CF_3SO_3)_2$), so that the magnesium ions fail to perform deposition and dissolution in a reversible way (Journal of Electroanalytical Chemistry, 1999, 466(2): 203-217). Thus, the simple mono-nuclei cationized magnesium salts cannot be used in the rechargeable magnesium battery. Through researches it is found that magnesium can perform deposition and dissolution in a reversible way in the ether solutions of Grignard reagents, but common Grignard reagents cannot be directly used as the electrolyte solution of the rechargeable magnesium battery because of too narrow electrochemical window and high activity. Then it is discovered that the ether solutions of organic boric magnesium salts and organic aluminum magnesium salts can also perform magnesium deposition and dissolution in a reversible way, so that a large progress is made in the practical use of the rechargeable magnesium battery. However, the cations of such electrolyte salts are usually dual-nuclei magnesium cations, have a large size, and generate an adverse effect on the ion conduction; and the anions contain organic radicals, and have poor electrochemical stability. In addition, the preparation of such electrolyte salts is complicated and relatively high in cost.

Therefore, developing a magnesium electrolyte salt with a simple structure, an efficient synthesis method and excellent electrochemical performance has an important significance for the commercialization of the rechargeable magnesium battery.

BRIEF SUMMARY OF THE INVENTION

The main objective of the invention is to provide a mono-nuclei cationized magnesium salt, a preparation method and applications thereof, to overcome defects in the prior art.

To fulfill the above objective, the invention employs the following technical solutions:

An embodiment of the invention provides a mono-nuclei cationized magnesium salt with a chemical formula of $MgR_nMX_{4-m}Y_m$, wherein R is a non-aqueous solvent molecule; M includes $Al^{3+}$ and/or $B^{3+}$; X and Y respectively include halide ion and halogenoid ion; n is any one integer selected in the range of 0-6, and m is any one integer selected in the range of 0-4.

In this embodiment, the halide ions include $F^-$, $Cl^-$, $Br^-$ or $I^-$.

In this embodiment, the halogenoid ions include $CN^-$ or $SCN^-$.

Further, R is preferable, but not limited to tetrahydrofuran, toluene, glycol dimethyl ether, diethylene glycol dimethyl ether, triethylene glycol dimethyl ether, tetraethylene glycol dimethyl ether, dioxane, pyridine, dimethyl sulfoxide, dimethyl formamide, N-methylimidazole, acetonitrile or polyethylene glycol dimethyl ether.

An embodiment of the invention also provides a synthesis method of the mono-nuclei cationized magnesium salt, including a step that, Lewis acid containing $Mg^{2+}$ and Lewis base containing $Al^{3+}$ and/or $B^{3+}$ react in a non-aqueous solvent to generate the mono-nuclei cationized magnesium salt.

Preferably, the synthesis method adopts the reaction temperature of 30- 200° C. and a reaction time of 3-48 h.

Further, the Lewis acid includes inorganic magnesium salts, for example $MgX_2$, wherein X includes halide ions or halogenoid ions.

Further, the Lewis base includes inorganic aluminum salts and/or inorganic boron salts, for example $AlY_3$ and $BY_3$, wherein Y includes halide ions or halogenoid ions.

Further, the halide ions include $F^-$, $CF^-$, $Br^-$ or $I^-$.

Further, the halogenoid ions include $CN^-$ or $SCN^{31}$.

Further, the non-aqueous solvent may be preferably selected from ionic liquids and/or organic solvents, for example, selected from imidazole ionic liquids such as 1-ethyl-3-methylimidazolium tetrafluoroborate and 1-ethyl-3-methylimidazolium bis(trifluoromethylsulfonyl)imide, pyrrolic ionic liquids such as N-butyl-N-methylpyrrolidinium bis(trifluoromethyl sulfonyl)imide, piperidine ionic liquids such as N-butyl-N-methylpiperidinium bis(trifluoromethyl sulfonyl)imide, and any one or more of organic solvents such as tetrahydrofuran, toluene, glycol dimethyl ether, diethylene glycol dimethyl ether, triethylene glycol dimethyl ether, tetraethylene glycol dimethyl ether, dioxane, pyridine, dimethyl sulfoxide, dimethyl formamide, N-methylimidazole, acetonitrile or polyethylene glycol dimethyl ether, and is not limited to the above.

In a preferable specific implementation solution, the synthesis method is as follows: an environmentally-friendly solvent ionic liquid with a high boiling point and high chemical and electric stability or an organic solvent with a high boiling point (for example, 1-butyl-1-methylpyrrolidinium bis (trifluoromethanesulfonyl) imide, N-butyl-N-methylpiperidinium bis(trifluoromethyl sulfonyl)imide, diethylene glycol dimethyl ether, triethylene glycol dimethyl ether, tetraethylene glycol dimethyl ether, polyethylene glycol dimethyl ether, etc.) is selected as the reaction solvent of the inorganic magnesium salt and inorganic aluminum salt and/or inorganic boron salt, and the Lewis acid of the inorganic aluminum salt and/or inorganic boron salt reacts with the Lewis base of the inorganic magnesium salt under the heating condition to obtain the mono-nuclei cationized magnesium salt (also called mono-nuclei magnesium-cation purely inorganic electrolyte salt).

An embodiment of the invention also provides an electrolyte solution, including a non-aqueous solvent which includes an organic solvent and/or an ionic liquid, and the mono-nuclei cationized magnesium salt dissolved in the non-aqueous solvent. In the electrolyte solution, the mono-nuclei cationized magnesium salt is electrolyte.

More preferably, the electrolyte solution has an electrolyte concentration of 0.1- 1.5 mol/L.

Further, the ionic liquids and/or organic solvents include imidazole ionic liquids such as 1-ethyl-3-methylimidazolium tetrafluoroborate and 1-ethyl-3-methylimidazolium bis (trifluoromethylsulfonyl)imide, pyrrolic ionic liquids such as N-butyl-N-methylpyrrolidinium bis(trifluoromethyl sulfonyl)imide, piperidine ionic liquids such as N-Butyl-N-methylpiperidinium bis(trifluoromethyl sulfonyl)imide, and any one or more of organic solvents such as tetrahydrofuran, toluene, glycol dimethyl ether, diethylene glycol dimethyl ether, triethylene glycol dimethyl ether, tetraethylene glycol dimethyl ether, dioxane, pyridine, dimethyl sulfoxide, dimethyl formamide, N-methylimidazole, acetonitrile or polyethylene glycol dimethyl ether, and are not limited to the above.

An embodiment of the invention also provides applications of the mono-nuclei cationized magnesium salt or the electrolyte solution to the preparation of magnesium batteries. In this embodiment, the magnesium batteries include disposable magnesium batteries or rechargeable magnesium batteries, for example, rechargeable magnesium sulfur batteries, but are not limited the above.

Compared with the prior art, the invention has the following advantages:

(1) A low-cost integrated synthesis method of the mono-nuclei cationized magnesium salt is provided; the raw materials are accessible; the preparation process is simple; scaled production is easy; and the provided synthesis method overcomes the defects of complication and high cost of the electrolyte salt synthesis method of the existing rechargeable batteries.

(2) The provided mono-nuclei cationized magnesium salt has a simple structure; the cation portion thereof includes mono-nuclei magnesium ions which help conduction of the magnesium ions; the anion portion includes no organic radical, and has relatively stable electrochemical properties and higher performance. The provided mono-nuclei cationized magnesium salt, on the one hand, overcomes the problem of failure to perform deposition and dissolution of the simple magnesium electrolyte salt in a reversible way, and on the other hand, can overcome the defects of complicated structure and huge difficulties in synthesis of the existing magnesium electrolyte salts which can perform magnesium deposition and dissolution in a reversible way, and plays an important role in the development of the rechargeable magnesium batteries.

(3) When the provided mono-nuclei cationized magnesium salt is used as the electrolyte solution of the rechargeable magnesium batteries, the generated electrolyte solution has a high ionic conductivity, a high reversible magnesium deposition-dissolution efficiency, excellent circulating performance and a high anode oxidation deposition potential. For example, when the electrolyte solution is applied to the magnesium sulphur rechargeable batteries, the initial discharging capacity of the batteries can reach over 700 mAh/g, and the cycle number can be greater than 20.

DETAILED DESCRIPTION OF THE INVENTION

Typical embodiments that embody the characteristics and advantages are described in detail below. It should be understood that the invention can have various variations at different embodiments, all within the scope of the invention, and the descriptions and drawings thereof should be regarded as explanation in nature, instead of limits in the invention.

Unless otherwise defined, all technical and scientific terms used in the text have meanings generally understood by those skilled in the technical field of the invention. The terms in text of the description of the invention are used only for the purpose of describing the specific embodiments of the invention, instead of limiting the invention.

Figure 1:
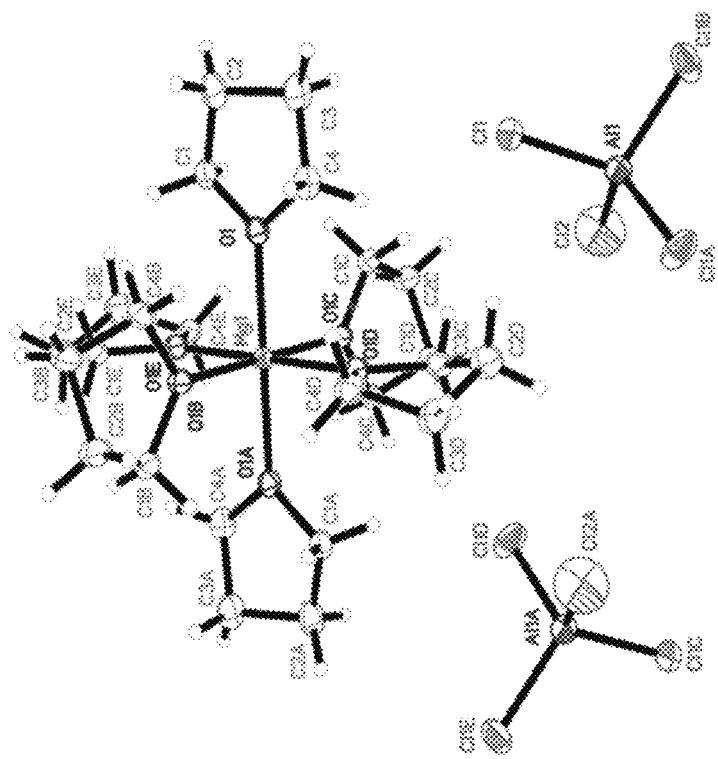
FIG. 1 is a crystal structural view of the obtained $[Mg(THF)_6][AlCl_4]_2$ in embodiment 1 of the invention.

Embodiment 1: 56 mg of anhydrous magnesium chloride ($MgCl_2$) and 158 mg of anhydrous aluminum chloride ($AlCl_3$) react in 1 mL of ionic liquid, namely 1-methyl-(1-butyl) pyrrolidinium bis(trifluoromethanesulfonyl)imide (PYR14TFSI), at a temperature of 95° C. for 24 hours to obtain a light yellow solution; the obtained solution is cooled to room temperature and then added into 1 mL of THF; and 0.3M rechargeable magnesium electrolyte solution is obtained. The crystal structure represents that the electrolyte salt is [Mg(THF)$_6$] [AlCl$_4$]$_2$, and the crystal structure can be seen in FIG. 1. The theoretical values according to the element analysis include C: 36.28, and H: 6.09; and the measured values include C: 36.27%, and N: 6.10%. Raman spectrum test results show that 350 cm$^{-1}$ is the characteristic peak of the anions AlCl$_4$$^-$, and the Raman peak of other aluminum chloride anions is not seen.

Embodiment 2: 56 mg of anhydrous magnesium chloride (MgCl$_2$) and 158 mg of anhydrous aluminum chloride (AlCl$_3$) react in 1 mL of triethylene glycol dimethyl ether (TEGDME) at a temperature of 30° C. for 24 hours to obtain a light yellow solution; the obtained solution is cooled to room temperature; and then, 0.6M rechargeable magnesium electrolyte solution is obtained. The crystal structure represents that the electrolyte salt is [Mg(TEGDME)$_2$] [AlCl$_4$]$_2$. The theoretical values according to the element analysis include C: 22.87, and H: 4.48; and the measured values include C: 22.89%, and N: 4.47%. Raman spectrum test results show that 350 cm$^{-1}$ is the characteristic peak of the anions AlCl$_4$$^-$, and the Raman peak of other aluminum chloride anions is not seen.

Embodiment 3: 56 mg of anhydrous magnesium chloride (MgCl$_2$) and 158 mg of anhydrous aluminum chloride (AlCl$_3$) react in 1 mL of toluene at a temperature of 100° C. for 24 hours to obtain a light yellow solution; the obtained solution is cooled to room temperature; and then, 0.6M rechargeable magnesium electrolyte solution is obtained. The crystal structure represents that the electrolyte salt is [Mg(toluene)$_6$] [AlCl$_4$]$_2$. The theoretical values according to the element analysis include C: 55.15, and H: 5.29; and the measured values include C: 55.10%, and H: 5.30%. Raman spectrum test results show that 350 cm$^{-1}$ is the characteristic peak of the anions AlCl$_4$$^-$, and the Raman peak of other aluminum chloride anions is not seen.

Embodiment 4: 56 mg of anhydrous magnesium chloride (MgCl$_2$) and 158 mg of anhydrous aluminum chloride (AlCl$_3$) react in 1 mL of polyethylene glycol dimethyl ether at a temperature of 95° C. for 24 hours to obtain a light yellow solution; the obtained solution is cooled to room temperature; and then, 0.6M rechargeable magnesium electrolyte solution is obtained. Raman spectrum test results show that 350 cm$^{-1}$ is the characteristic peak of the anions AlCl$_4$$^-$, and the Raman peak of other aluminum chloride anions is not seen.

Embodiment 5: 56 mg of anhydrous magnesium chloride (MgCl$_2$) and 158 mg of anhydrous aluminum chloride (AlCl$_3$) react in 1 mL of dimethyl sulfoxide (DMSO) at a temperature of 120° C. for 24 hours to obtain a light yellow solution; the obtained solution is cooled to room temperature; and then, 0.6M rechargeable magnesium electrolyte solution is obtained. The crystal structure represents that the electrolyte salt is [Mg(DMSO)$_6$] [AlCl$_4$]$_2$. The theoretical values according to the element analysis include C: 17.35, and H: 4.37; and the measured values include C: 17.36%, and H: 4.37%. Raman spectrum test results show that 350 cm$^{-1}$ is the characteristic peak of the anions AlCl$_4$$^-$, and the Raman peak of other aluminum chloride anions is not seen.

Embodiment 6: 56 mg of anhydrous magnesium chloride (MgCl$_2$) and 100.8 mg of anhydrous aluminum fluoride (AlF$_3$) react in 1 mL of ionic liquid, namely 1-methyl-(1-butyl) pyrrolidinium bis(trifluoromethanesulfonyl)imide (PYR14TFSI), at a temperature of 150° C. for 24 hours to obtain a light yellow solution; the obtained solution is cooled to room temperature and then added into 1 mL of THF; and 0.3M rechargeable magnesium electrolyte solution is obtained. The crystal structure represents that the electrolyte salt is [Mg(THF)$_6$] [AlClF$_3$]$_2$. The theoretical values according to the element analysis include C: 41.43, and H: 6.95; and the measured values include C: 41.40%, and H: 6.97%.

Embodiment 7: 19 mg of anhydrous magnesium chloride (MgCl$_2$) and 100.8 mg of anhydrous aluminum fluoride (AlF$_3$) react in 1 mL of dimethyl sulfoxide (DMSO) at a temperature of 200° C. for 24 hours to obtain a light yellow solution; the obtained solution is cooled to room temperature; and then, 0.6M rechargeable magnesium electrolyte solution is obtained. The crystal structure represents that the electrolyte salt is [Mg(DMSO)$_6$] [AlF$_4$]$_2$. The theoretical values according to the element analysis include C: 20.62, and H: 5.19; and the measured values include C: 20.61%, and H: 5.20%.

Embodiment 8: 56 mg of anhydrous magnesium chloride (MgCl$_2$) and 69 mg of anhydrous boron chloride (BCl$_3$) react in 1 mL of ionic liquid, namely 1-methyl-(1-butyl) pyrrolidinium bis_(trifluoromethanesulfonyl)_imide (PYR14TFSI), at a temperature of 95° C. for 24 hours to obtain a light yellow solution; the obtained solution is cooled to room temperature and then added into 1 mL of THF; and 0.3M rechargeable magnesium electrolyte solution is obtained. The crystal structure represents that the electrolyte salt is [Mg(THF)$_6$] [BCl$_4$]$_2$. The theoretical values according to the element analysis include C: 37.82, and H: 6.35; and the measured values include C: 37.82%, and H: 6.34%.

Figure 2:
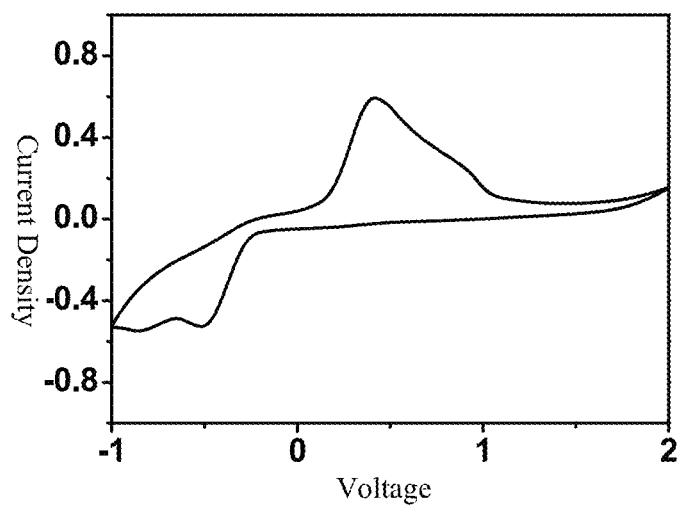
FIG. 2 is a cyclic voltammogram of the $[Mg(THF)_6][AlCl_4]_2$ in embodiment 7 of the invention.
Figure 3:
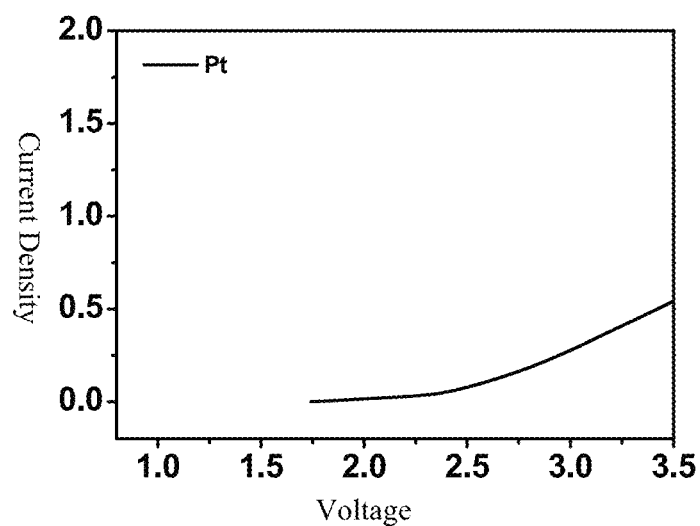
FIG. 3 is a linearly scanned voltammogram of the $[Mg(THF)_6][AlCl_4]_2$ in embodiment 7 of the invention.

Embodiment 9: Platinum is used as a working electrode; the PYR14TFSI/THF solution of 0.3M magnesium salt ([Mg(THF)$_6$] [AlCl$_4$]$_2$) is used as the electrolyte solution; and metal magnesium is used as a counter electrode and a reference electrode. The three units are assembled to form a three-electrode system. The system undergoes cyclic voltammetry in an argon glove box. The scanning rate is 25 mV/s. The results of cyclic voltammetry and linearly scanned voltammetry can be seen in FIG. 2 and FIG. 3. From FIG. 2 it can be known that the oxidation-reduction process that appears nearby 0.2V and −0.2V vs. Mg corresponds to the deposition and dissolution of magnesium, and the oxidation potential of the anode can reach 2.5V vs. Mg.

Figure 4:
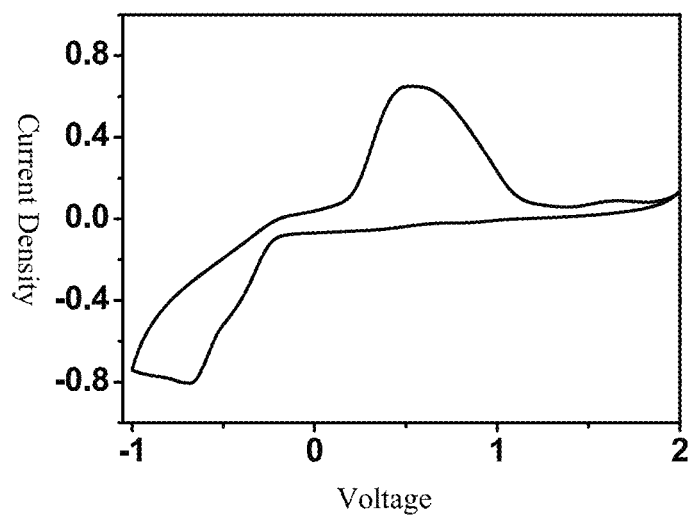
FIG. 4 is a cyclic voltammogram of the $[Mg(DMSO)_6][AlCl_4]_2$ in embodiment 8 of the invention.

Embodiment 10: Copper is used as a working electrode; the PYR14TFSI/THF solution of 0.3M magnesium salt ([Mg(DMSO)$_6$] [AlCl$_4$]$_2$) is used as the electrolyte solution; and metal magnesium is used as a counter electrode and a reference electrode. The three units are assembled to form a three-electrode system. The system undergoes cyclic voltammetry in an argon glove box. The scanning rate is 25 mV/s. The cyclic voltammetry results can be seen in FIG. 4. From FIG. 4 it can be known that the oxidation-reduction process that appears nearby 0.2V and −0.2V vs. Mg corresponds to the deposition and dissolution of magnesium.

Figure 5:
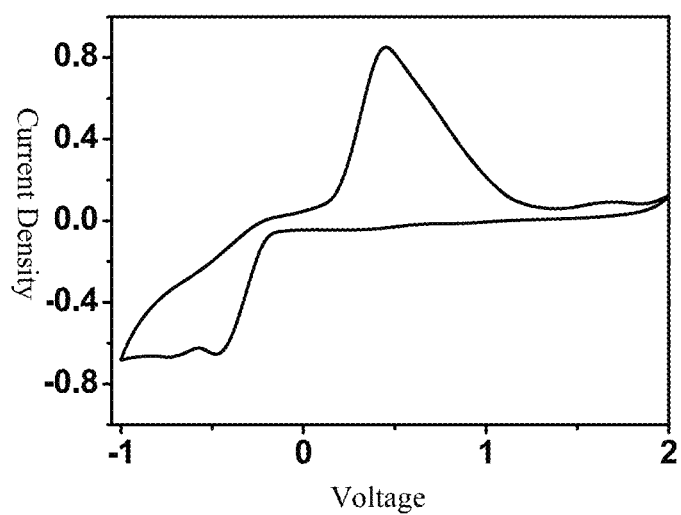
FIG. 5 is a cyclic voltammogram of the $[Mg(DMSO)_6][AlF_4]_2$ in embodiment 9 of the invention.

Embodiment 11: Platinum is used as a working electrode; the DMSO solution of 0.3M magnesium salt ([Mg(DMSO)$_6$] [AlF$_4$]$_2$) is used as the electrolyte solution; and metal magnesium is used as a counter electrode and a reference electrode. The three units are assembled to form a three-electrode system. The system undergoes cyclic voltammetry in an argon glove box. The scanning rate is 25 mV/s. The cyclic voltammetry results can be seen in FIG. 5. From FIG. 5 it can be known that the oxidation-reduction process that appears nearby 0.2V and −0.2V vs. Mg corresponds to the deposition and dissolution of magnesium, and the oxidation potential of the anode can reach 2.6V vs. Mg.

Figure 6:
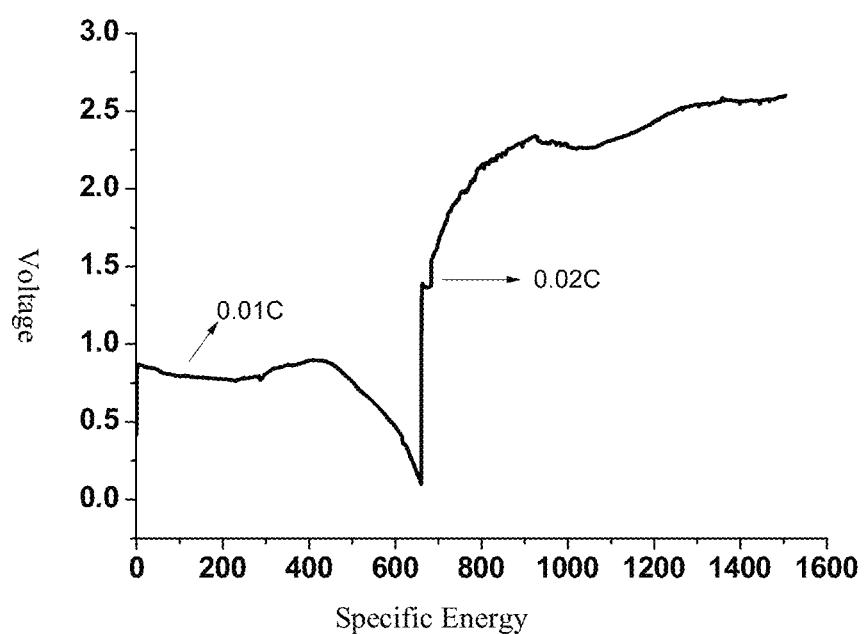
FIG. 6 is a first charging-discharging curve diagram of a magnesium sulphur battery in embodiment 12 of the invention.
Figure 7:
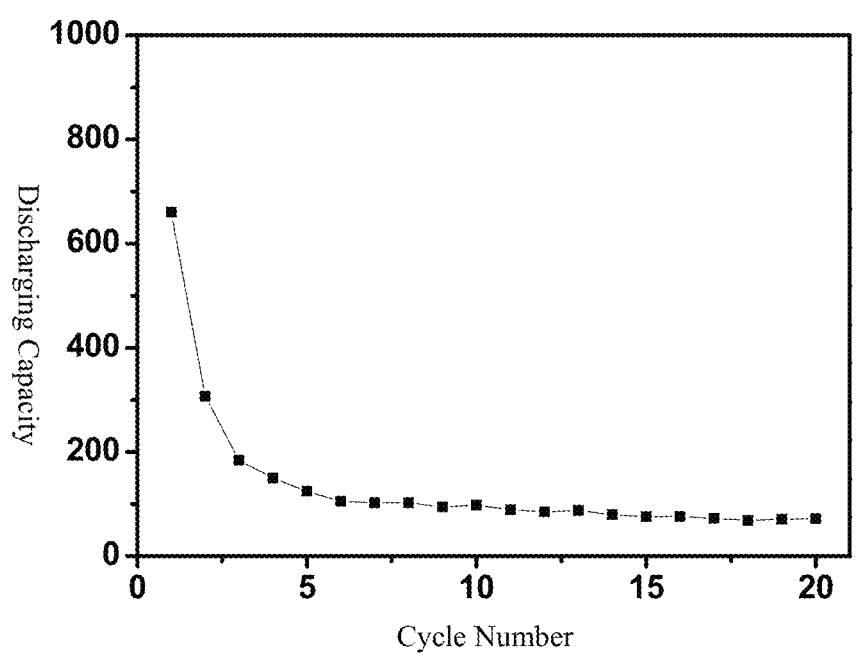
FIG. 7 is a cycle performance test diagram of the magnesium sulphur battery in embodiment 12 of the invention.

Embodiment 12: A sulphur-carbon compound (S/C) is used as the electrolyte solution; the PYR14TFSI/THF solution of 0.3M magnesium salt ([Mg(THF)$_6$] [AlCl$_4$]$_2$) is used as the electrolyte solution; and the metal magnesium is used as the cathode. The three units are assembled to form a magnesium-sulphur battery. The charging-discharging curve and the cyclic performance test results can be seen in FIG. 6 and FIG. 7. From FIG. 6 and FIG. 7 it can be known that magnesium-sulphur battery has an initial discharging capacity of approx. 700 mAh/G and has a cycle number of greater than 20.

All product structural parameters, all reaction participants and process conditions in the above embodiments are all typical examples. However, a large number of experiments made by the inventor show that other different structural parameters, other types of reaction participants and process conditions are also applicable, and can achieve the Claimed technical effects of the invention.

It should be explained that the terms "comprise", "include" or any other synonyms are intended to cover non-exclusive inclusion, so the processes, methods, articles or devices of a series of elements include not only those elements, but also other elements which are not clearly listed, or also include all inherent factors of those processes, methods, articles or terminals. In the case of no more limit, the elements defined by the sentence "comprising/including a/an . . . " should not exclude that the processes, methods, articles or devices including the elements also include other identical elements.

The above embodiments are specific embodiments of the invention. It should be noted that, for those ordinarily skilled in the art, various improvements and changes can be made on the basis of the principle of the invention. The improvements and changes shall also fall within the protective scope of the invention.

What is claimed is:

1. An electrolyte solution, comprising:
   an electrolyte solvent comprising an non-aqueous solvent and an ionic liquid, and
   an electrolyte comprising a magnesium salt dissolved in the electrolyte solvent,
   wherein the magnesium salt is mono-nuclei cationized and has a chemical formula of MgR$_n$MX$_{4-m}$Y$_m$,
   wherein R is a non-aqueous solvent molecule selected from the group consisting of tetrahydrofuran, toluene, dioxane, pyridine, dimethyl sulfoxide, dimethyl formamide, N-methylimidazole, acetonitrile, glycol dimethyl ether, triethylene glycol dimethyl ether (TEGDME), and polyethylene glycol dimethyl ether;
   M includes at least one of Al$^{3+}$or B$^{3+}$;
   X and Y respectively comprise halide ions or halogenoid ions; wherein the halogenoid ions include CN$^-$or SCN$^-$;
   n is any one integer selected in the range of 0-6, and m is any one integer selected in the range of 0-4.

2. The electrolyte solution of claim 1, having an electrolyte concentration of 0.1-1.5 mol/L.

3. The electrolyte solution of claim 1, wherein the ionic liquid is selected from a group consisting of imidazole ionic liquids, pyrrolic ionic liquids, and piperidine ionic liquids and the non-aqueous solvent is selected from the group consisting of tetrahydrofuran, toluene, glycol dimethyl ether, diethylene glycol dimethyl ether, triethylene glycol dimethyl ether, tetraethylene glycol dimethyl ether, dioxane, pyridine, dimethyl sulfoxide, dimethyl formamide, N-methylimidazole, acetonitrile, and polyethylene glycol dimethyl ether.

4. A method of making a magnesium battery, the method comprising,
   assembling a magnesium battery using the electrolyte solution of claim 1,
   wherein the magnesium battery can be a disposable magnesium battery or a rechargeable magnesium battery.

5. The electrolyte solution of claim 1, wherein the ionic liquid is 1-methyl-(1-butyl) pyrrolidinium bis(trifluoromethanesulfonyl)imide (PYR14TFSI).

6. The electrolyte solution of claim 5, wherein the electrolyte solvent is PYR14TFSI/THF and the magnesium salt is [Mg(THF)$_6$] [AlCl$_4$]$_2$.

7. The electrolyte solution of claim 1, wherein the magnesium salt is selected from the group consisting of [Mg(THF)$_6$][AlCl$_4$]$_2$, [Mg(THF)$_6$][AlF$_4$]$_2$, [Mg(THF)$_6$][AlClF$_3$]$_2$, [Mg(THF)$_6$][BCl$_4$]$_2$, [Mg(TEGDME)$_2$][AlCl$_4$]$_2$, [Mg(toluene)$_6$][AlCl$_4$]$_2$, [Mg(DMSO)$_6$][AlCl$_4$]$_2$, and [Mg(DMSO)$_6$][AlF$_4$]$_2$.

8. A method to synthesize an electrolyte solution that comprises an electrolyte solvent and an electrolyte,
   wherein the electrolyte comprises a magnesium salt having a chemical formula of MgR$_n$MX$_{4m}$Y$_m$,
   wherein R is a non-aqueous solvent molecule, selected from the group consisting of tetrahydrofuran, toluene, dioxane, pyridine, dimethyl sulfoxide, dimethyl formamide, N-methylimidazole, acetonitrile, glycol dimethyl ether, triethylene glycol dimethyl ether, and polyethylene glycol dimethyl ether;
   M includes at least one of Al$^{3+}$or B$^{3+}$;
   X and Y respectively comprise halide ions or halogenoid ions; wherein the halogenoid ions include CN$^-$or SCN$^-$;
   n is any one integer selected in the range of 0-6, and
   m is any one integer selected in the range of 0-4, the method comprising:
   reacting a Lewis acid containing Mg$^{2+}$with a Lewis base containing at least one of Al$^{3+}$or B$^{3+}$in an ionic liquid to generate an intermediate solution, and
   adding a non-aqueous solvent into the intermediate solution to form the electrolyte solution, wherein the magnesium salt is mono-mucleic cationized and the electrolyte solvent comprises the ionic liquid and the non-aqueous solvent.

9. The method of claim 8, wherein the Lewis acid and the Lewis base are reacted in a temperature of 30-200° C. and a reaction time of 3-48h.

10. The method of claim 8, wherein the Lewis acid includes inorganic magnesium salts MgX$_2$, and X is selected from a group consisting of halide ions or halogenoid ions; the Lewis base includes at least one of inorganic aluminum salts AlY$_3$ or boron salts BY$_3$, and Y is selected from a group consisting of halide ions or halogenoid ions; and the halogenoid ions include CN$^-$or SCN$^-$.

11. The method of claim 8, wherein the ionic liquid consists of at least one of imidazole ionic liquids, pyrrolic ionic liquids, or piperidine ionic liquids.

12. The synthesis method of claim 8, wherein the non-aqueous solvent is selected from a group consisting of tetrahydrofuran, toluene, glycol dimethyl ether, diethylene glycol dimethyl ether, triethylene glycol dimethyl ether, tetraethylene glycol dimethyl ether, dioxane, pyridine, dimethyl sulfoxide, dimethyl formamide, N-methylimidazole, acetonitrile, and polyethylene glycol dimethyl ether.

13. The synthesis method of claim 8, wherein the electrolyte solution has an electrolyte concentration of 0.1-1.5 mol/L.

14. The synthesis method of claim 8, wherein the ionic liquid is 1-methyl-(1-butyl) pyrrolidinium bis(trifluoromethanesulfonyl)imide (PYR14TFSl).

15. The synthesis method of claim 8, wherein the non-aqueous solvent is THF and the solvent of the electrolyte solution is PYR14TFSl/THF.

16. The synthesis method of claim 8, wherein the Lewis acid is $MgCl_2$.

17. The synthesis method of claim 8, wherein the Lewis base is selected from the group consisting of $AlCl_3$, $AlF_3$, and $BCl_3$.

\* \* \* \* \*